(12) United States Patent
Oborowski

(10) Patent No.: US 12,337,697 B2
(45) Date of Patent: Jun. 24, 2025

(54) ELECTRIC DRIVE APPARATUS FOR A VEHICLE AND METHOD FOR OPERATING AN ELECTRIC DRIVE APPARATUS FOR A VEHICLE

(71) Applicant: Robert Bosch GmbH, Stuttgart (DE)

(72) Inventor: Paul Oborowski, Benningen (DE)

(73) Assignee: Robert Bosch GmbH, Stuttgart (DE)

( * ) Notice: Subject to any disclaimer, the term of this patent is extended or adjusted under 35 U.S.C. 154(b) by 245 days.

(21) Appl. No.: 18/258,445

(22) PCT Filed: Dec. 9, 2021

(86) PCT No.: PCT/EP2021/084940
§ 371 (c)(1),
(2) Date: Jun. 20, 2023

(87) PCT Pub. No.: WO2022/135951
PCT Pub. Date: Jun. 30, 2022

(65) Prior Publication Data
US 2024/0034156 A1   Feb. 1, 2024

(30) Foreign Application Priority Data

Dec. 21, 2020 (DE) .................. 10 2020 216 373.1

(51) Int. Cl.
*B60L 15/20* (2006.01)

(52) U.S. Cl.
CPC .......... *B60L 15/20* (2013.01); *B60L 2220/42* (2013.01); *B60L 2240/423* (2013.01); *B60L 2240/425* (2013.01); *B60L 2260/28* (2013.01)

(58) Field of Classification Search
CPC ............... B60L 15/20; B60L 2240/42; B60L 2240/423; B60L 2240/425; B60L 2260/28
See application file for complete search history.

(56) References Cited

U.S. PATENT DOCUMENTS

| | | | |
|---|---|---|---|
| 6,549,840 B1 * | 4/2003 | Mikami ................. | B60K 6/365 903/910 |
| 7,090,613 B2 * | 8/2006 | Heap ................... | B60W 10/105 701/55 |

(Continued)

FOREIGN PATENT DOCUMENTS

| | | |
|---|---|---|
| EP | 2428704 A1 | 3/2012 |
| EP | 3708407 A1 | 9/2020 |

OTHER PUBLICATIONS

Translation of International Search Report for PCT/EP2021/084940 dated Apr. 8, 2022 (2 pages).

*Primary Examiner* — Gertrude Arthur Jeanglaude
(74) *Attorney, Agent, or Firm* — Michael Best & Friedrich LLP

(57) ABSTRACT

The present invention provides an electric drive apparatus (10) for a vehicle (F) comprising a first electric drive (E1), a second electric drive (E2) and a control device (SE), which is connected to the first electric drive (E1) and to the second electric drive (E2) and is designed to ascertain a first operating temperature (T1) of the first electric drive (E1) and a second operating temperature (T2) of the second electric drive (E2) and to control generation of a first torque (M1) on the first electric drive (E1) and/or of a second torque (M2) on the second electric drive (E2) on the basis of a driving situation of the vehicle and/or on the basis of the first operating temperature (T1) and/or on the basis of the second operating temperature (2).

12 Claims, 3 Drawing Sheets

(56) References Cited

U.S. PATENT DOCUMENTS

| | | | |
|---|---|---|---|
| 7,699,737 B2* | 4/2010 | Berhan | B60K 6/485 |
| | | | 475/5 |
| 2008/0125265 A1* | 5/2008 | Conlon | B60K 6/40 |
| | | | 475/5 |
| 2010/0125019 A1* | 5/2010 | Tabata | B60K 6/40 |
| | | | 180/65.265 |
| 2015/0367832 A1* | 12/2015 | Oshiumi | B60W 30/1846 |
| | | | 903/910 |
| 2016/0185247 A1 | 6/2016 | Sakaguchi | |
| 2019/0263413 A1 | 8/2019 | Hancock et al. | |
| 2021/0016659 A1 | 1/2021 | Kono | |

\* cited by examiner

ELECTRIC DRIVE APPARATUS FOR A VEHICLE AND METHOD FOR OPERATING AN ELECTRIC DRIVE APPARATUS FOR A VEHICLE

BACKGROUND

The present invention relates to an electric drive apparatus for a vehicle and a method for operating an electric drive apparatus for a vehicle.

Conventional electrical vehicles typically only comprise one electric drive per axle and a differential for distributing torque, which can also be used to compensate for different wheel speeds when traveling along a curve.

Furthermore, in electrical vehicles having two driven axles, the ratio of the applied torque can be varied between the front axle and the rear axle.

It should in this context be noted that torque distribution strategies can typically be based on a response to previously limited drive torque limits.

Specified in EP 2428704 A1 is an oil supply device comprising a regulator. The regulator is used to set a drive torque value and to regulate an electrical motor so that the electrical motor outputs a drive torque corresponding to the oil temperature.

SUMMARY

The present invention creates an electric drive apparatus for a vehicle and a method for operating an electric drive apparatus for a vehicle.

The underlying idea of the present invention is to specify an electric drive apparatus for a vehicle and a method for operating an electric drive apparatus for a vehicle, whereby a torque distribution between a first drive and a second drive can be generated. Excessive heating of one of the drives can thereby be reduced or even avoided. A preventive adjustment of the torque distribution can be implemented, which can represent a reaction to increasing temperatures on one or both drives.

The variation in torque can thus represent a degree of freedom which can typically be used to improve driving behavior (acceleration, cornering), whereby the torque distribution can be dynamically adjusted to the driving situation. The minimum and maximum values of the torque distribution or a sum of both torques can oriented to the current state of the driven axles and the battery (temperature, voltage level).

In the event that one of the two drives reaches a critical temperature, it is possible that the drive in question will limit the maximum available torque. The unavailable amount of torque can then be applied from the other axle. If such a limitation is performed on both axles, then the total torque can be reduced. The total torque is also limited if redistribution cannot occur at a limit temperature due to a current driving situation.

According to the present invention, the electric drive apparatus for a vehicle comprises a first electric drive, which is mountable on front axle of the vehicle; a second electric drive, which is mountable on a rear axle of the vehicle; a control device, which is connected to the first electric drive and the second electric drive and is designed to ascertain a first operating temperature of the first electric drive and a second operating temperature of the second electric drive, and to control generation of a first torque on the first electric drive and/or a second torque on the second electric drive on the basis of a driving situation of the vehicle and/or on the basis of the first operating temperature and/or the second operating temperature, whereby the respective first torque or the second torque whose associated operating temperature exceeds a predetermined value is reducible, and the corresponding other respective first or second torque whose associated operating temperature is lower than the predetermined value is increasable.

The control device can be a control device also used to control an electric machine (on the respective drive or on both drives) and is connectable to the vehicle's onboard power supply.

The driving situation can be a particular performance requirement on one of the axles (e.g., different or the same) or other specifications or requirements, e.g., the approach to a hill, when driving along curves, at different loads, or other factors.

The predetermined value can correspond to a predetermined limit value of the temperature on the respective drive, in which case it can be assumed that operation of the drive below this limit value can preserve the drive, and the drive can then also generate maximum power and torque.

In this manner, the torque distribution can even be adjusted when approaching the limit temperature for operating the respective drive. This early reaction reduces further temperature increase of the hot drive.

The drive device can be used and be provided on electric vehicles, (plug-in) hybrid vehicles, fuel cell vehicles, electric scooters, electric bicycles with two independent electric drives, or other vehicles. A defined temperature ratio between the drives in the vehicle can then be adjusted, or a temperature imbalance can be compensated for by adjusting the torque distribution.

Given improved torque distribution, a greater peak power availability in both drives can be enabled, greater availability of the maximum adjustable torque distribution range can be achieved, and the cooling system can be supported in regulating the temperature of the drives.

According to the invention, it is advantageously possible to detect and load the cooler drive more heavily than the warmer drive, whereby the cooler drive can then assume torque which can then be reduced on the warmer drive. A thermal balance between the drives can thus be achieved, or at least an approximation thereof can be made, thereby delaying or even avoiding a reduction in torque limits. This type of thermal redistribution can be performed in non-critical driving situations, e.g., in the case of driving in a straight line. In driving situations that require a different—not thermally oriented—distribution, the distribution can be changed to a distribution oriented to driving dynamics and prioritized such that a greater adjustment range for the torque and a greater total torque can then be available, since the drive temperature can be at least partially adjusted in advance.

According to one preferred embodiment of the electric drive apparatus, the predetermined value comprises a first limit value for the first operating temperature and a second limit value for a second operating temperature.

The drives can be differently designed and constructed, and thus feature different temperature limits at which their performance and/or applicable torque may be impaired.

It can also be possible that more than two electrical drives be provided and that further operating temperatures can then also be ascertained and taken into account for these further drives, and that a torque distribution can take place among these drives. It is also possible to compare as many operating temperatures of drives as desired. This particular operating temperature should thereby match the corresponding component (drive), e.g., front/rear rotor temperature, front/rear oil temperature, front/rear stator temperature, front/rear semiconductor temperature. For example, a vehicle having three electric machines can be provided and considered, one electric machine being located in the front axle and two in the rear axle. More than two drives and electric machines can be provided, e.g., two electric machines per axle on the vehicle.

According to one preferred embodiment of the electric drive apparatus, the latter comprises a first temperature sensor device for the first electric drive, using which sensor device the first operating temperature can be sensed and communicated to the control device, and a second temperature sensor device for the second electric drive, using which sensor device the second operating temperature can be sensed and communicated to the control device.

According to a preferred embodiment of the electric drive apparatus, the latter comprises a regulation device, by means of which a torque distribution between the first electric drive and the second electric drive can be regulated.

The regulation device can regulate a torque generation on the respective drive on the basis of the current temperature on said drive because the electric machine on this drive is controllable.

According to one preferred embodiment of the electric drive apparatus, the control device is designed to form a first differential value between a maximum limit temperature and a current temperature for the first electric drive and/or a second differential value between a maximum limit temperature and a current temperature for the second electric drive, and to determine a reserve for a remaining torque still able to be generated on the respective drive. In this context, further temperatures and their differences can also be generated for further components.

Regarding the maximum limit temperature, this can be a predetermined quantity, advantageously that at which the drive begins to reduce the maximum allowable torque. The maximum allowable torque for this drive can then be reduced proportionally to the temperature further increasing beyond this limit. The limit temperature does not necessarily correspond to the maximum allowable temperature of the respective component. It can instead describe the temperature value from which a component protection function can be activated (e.g., a torque distribution) and the maximum torque (peak torque) can be limited.

The maximum limit temperature can correspond to the predetermined value for the operating temperature at the particular drive. The reserve can represent a potential of the drive that can still be used, such as how much torque can still be provided at the drive with an acceptable residual increase in operating temperature before the maximum (predetermined) limit temperature is reached there.

According to one preferred embodiment of the electric drive apparatus, the control device is designed to influence the first operating temperature and/or the second operating temperature by means of a torque distribution able to be generated in order to maintain these temperatures below a respective limit value.

The torque distribution can be controlled by appropriately actuating the electric machine and/or the corresponding gearbox on the respective drive.

According to the invention, in the method for operating an electric drive apparatus for a vehicle, an electric drive apparatus according to the invention is provided; a first operating temperature of the first electric drive and a second operating temperature of the second electric drive are ascertained; controlling the generation of a first torque at the first electric drive and/or of a second torque at the second electric drive on the basis of a driving situation of the vehicle and/or on the basis of the first operating temperature and/or of the second operating temperature by means of the control device, whereby the respective first torque or the second torque whose associated operating temperature exceeds a predetermined value is reduced, and the corresponding other respective first or second torque whose associated operating temperature is lower than the predetermined value is increased.

The torque increase at the cooler drive can advantageously be performed until the limit temperature of that drive is reached. Until that time, the full torque of the vehicle can be maintained. The total torque can then be decreased only once the operating temperature on both drives is at or above the limit value. The limit value can in this case be lower than a critical temperature value, at which the drive would only be able to deliver very little or no torque. The temperature adjustment on the respective drive can then advantageously take place preventively, before the operating temperature on that drive would approach the critical temperature.

According to one preferred embodiment of the method for operating an electric drive apparatus, a current temperature, and a maximum limit temperature and/or a maximum achievable torque, and a minimum achievable torque are ascertained for the first electric drive and/or for the second electric drive.

According to a preferred embodiment of the method for operating an electric drive apparatus, a first differential value between the maximum limit temperature and the current temperature for the first electric drive and/or a second differential value between the maximum limit temperature and the current temperature for the second electric drive is formed and, on this basis, a reserve for a torque to be generated on the respective drive is ascertained.

According to one preferred embodiment of the method of operating an electric drive apparatus, a control deviation is ascertained, which is ascertained for the respective drive from a difference between a predetermined temperature differential of both drives relative to each other and the respective differential value of the drive, in which case the predetermined temperature difference represents a weighting of a utilization of the reserve, whereby the control deviation is converted into a torque distribution between the drives and/or set using a regulation device.

The predetermined temperature differential can correspond to a desired load difference of the drives, but it can also be zero.

The control deviation can represent an auxiliary variable for ascertaining the remaining possible temperature reserve and the torque able to be generated on the respective drive, or on both drives.

According to one preferred embodiment of the method for operating an electric drive apparatus, the regulation device provides a characteristic curve for distributing the torques on the drives.

This characteristic curve can be used to better specify an operation of the regulation device.

According to a preferred embodiment of the method for operating an electric drive apparatus, the first operating temperature and/or the second operating temperature are influenced by a generated torque distribution in order to keep said temperature(s) below a respective limit value.

The method is furthermore also characterized by the features and advantages mentioned hereinabove in relation to the electric drive apparatus, and vice versa.

Further features and advantages of the embodiments of the invention follow from the subsequent description with reference to the accompanying drawings.

BRIEF DESCRIPTION OF THE DRAWINGS

The present invention is explained in greater detail hereinafter with reference to the exemplary embodiments indicated in the schematic figures of the drawings.
Shown are.

In the drawings, identical reference signs denote identical or functionally identical elements.

DETAILED DESCRIPTION

Figure 1:
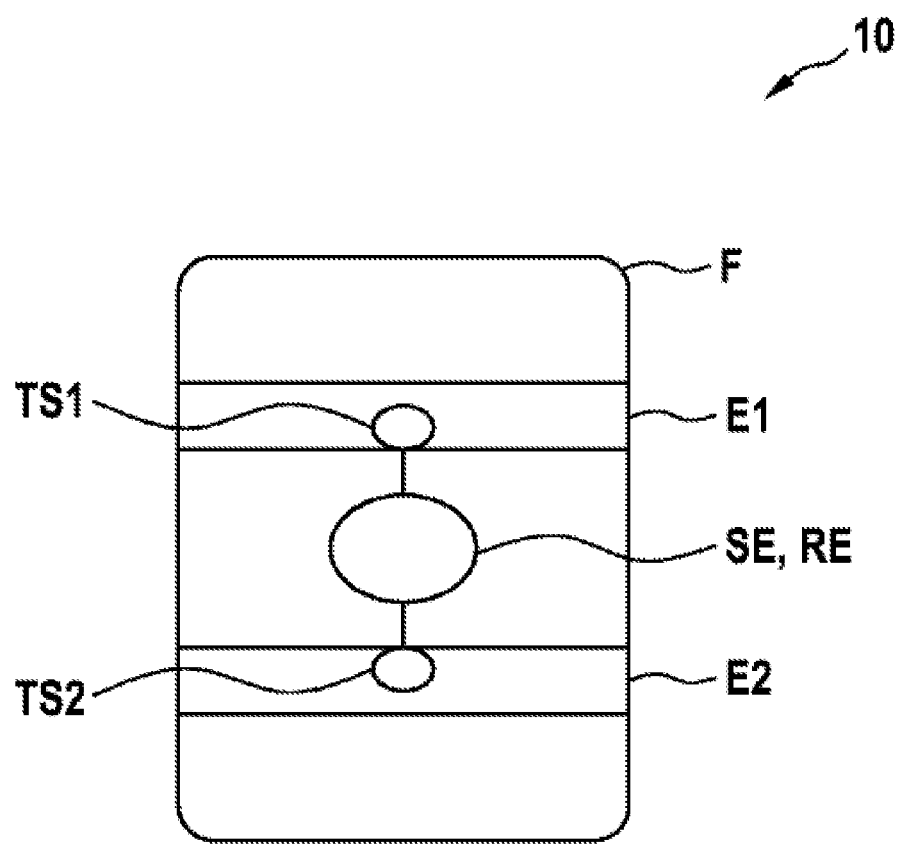
FIG. 1 a schematic diagram of a vehicle having an electric drive apparatus according to one exemplary embodiment of the present invention.

FIG. 1 shows a schematic diagram of a vehicle having an electric drive apparatus according to one exemplary embodiment of the present invention.

The electric drive apparatus 10 for a vehicle F comprises a first electric drive E1, which is mountable on a front axle of the vehicle; a second electric drive E2, which is mountable on a rear axle of the vehicle F; a control device SE, which is connected to the first electric drive E1 and the second electric drive E2 and is designed to ascertain a first operating temperature of the first electric drive E1 and a second operating temperature of the second electric drive E2 and to control generation of a first torque on the first electric drive E1 and/or of a second torque on the second electric drive E2 on the basis of a driving situation of the vehicle and/or on the basis of the first operating temperature and/or of the second operating temperature, whereby the respective first torque or the second torque whose associated operating temperature exceeds a predetermined value is reducible, and the corresponding other respective first or second torque whose associated operating temperature is lower than the predetermined value is increasable.

The electric drive apparatus 10 can comprise a first temperature sensor device TS1 for the first electric drive E1, using which sensor device the first operating temperature can be sensed and communicated to the control device SE, as well as a second temperature sensor device TS2 for the second electric drive E2, using which sensor device the second operating temperature can be sensed and communicated to the control device SE.

The first drive E1 can be formed as an electrical axle and can comprise the first temperature sensor device TS1. The second drive E2 can be formed as an electrical axle and can comprise the second temperature sensor device TS2.

The electric drive apparatus 10 can comprise a regulation device RE, using which a torque distribution between the first electric drive E1 and the second electric drive E2 can be regulated.

Figure 2:
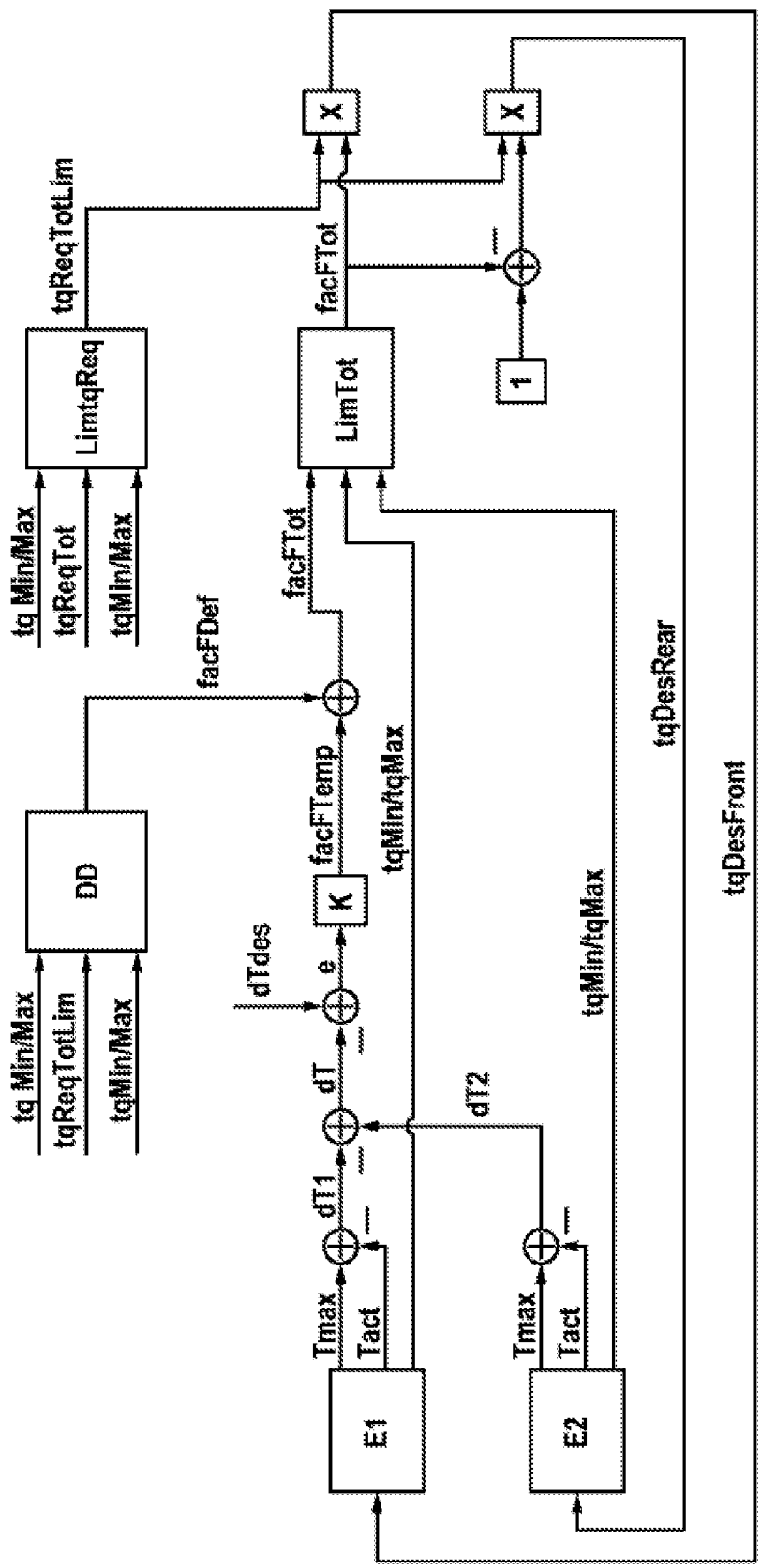
FIG. 2 a block diagram for ascertaining parameters in a method of operating an electric drive apparatus for a vehicle according to an exemplary embodiment of the present invention.

FIG. 2 shows a block diagram for ascertaining parameters in a method of operating an electric drive apparatus for a vehicle according to one exemplary embodiment of the present invention.

FIG. 2 shows an overall strategy for distributing torque among the drives. A basic strategy for torque distribution (signal facFDef) can thereby be selected and predetermined. This basic distribution is generated, e.g., based on optimization of traction or consumption. The associated control variables can in this case converge in a regulator DD, or can be predetermined in said regulator. However, the regulator DD can in this case also be omitted.

A correction value can then be added to this basic distribution facFDef, and can be responsible for equalizing (regulating) the drive temperatures (facFTemp). If no active equalization is required, then the value of this signal is zero. The resulting signal facFTot is then the specification for torque distribution, which is subsequently utilized as a reference, and can be implemented by the system within the current torque limits. In other words, in the LimTot block the distribution factor can be adjusted again if the desired sum torque (tqReqTotLim) cannot be implemented with the distribution factor facFTot. This is important if the driver still wishes to draw the maximum torque even when redistribution is active due to a hot axle.

The output signal from LimTot and the sum torque are then used to calculate the target torque for the front (tqDesFront) and rear drives (tqDesRear). The LimTqReq block describes the limitation of the sum torque based on the reported maximum torques of the front and rear drives.

It should in this context be understood that all signals with a "fac" term always describe a distribution value between 0 and 1. The value 0 signifies that the desired torque is implemented entirely via the rear axle, whereas the value 1 signifies that the desired torque is implemented entirely via the front axle. The core of the invention lies in the calculation of facFTemp and its additive integration into the operating strategy or into a known operating strategy which can be additionally used.

The drive apparatus can be a drive apparatus, as shown by way of example in FIG. 1. The temperature sensor devices can in this case be provided on both the first drive E1 and the second drive E2 (not shown). The first drive E1 and second drive E2 can in this case send measurement signals to the control device, via which the temperature conditions and torque ratios can be ascertained on the drives. A first operating temperature T1 (generally referred to as a Tact) can be ascertained on the first drive E1 and a second operating temperature T2 (generally referred to as a Tact) on the second drive, which can represent the current temperatures during operation. The first torque and the second torque can be ascertained in similar manner. For each drive, a predetermined limit value Tmax can in this case be known and also transmitted to the control device, in which case the predetermined value can comprise a first limit value Tmax for the first operating temperature and a second limit value Tmax for a second operating temperature. Temperature limit values can also be predetermined or known for the torques of the drives, and these current torque limits tqMin and tqMax can then be communicated to the control device (symbolically shown in FIG. 2 as the LimTot evaluation routine). In FIG. 2, these torque limits for the two drives are identified using the same reference characters, but may differ from one another if the operating temperature on the drives is different and/or the drives have different dimensions. The temperature information can be sent as either a maximum (limit value) and/or current operating temperature, or as a difference on this basis (dT1, dT2).

The control device can in this case be designed to form a first differential value dT1 between a maximum limit temperature Tmax and a current temperature Tact for the first electric drive E1 and/or a second differential value dT2 between a maximum limit temperature Tmax and a current temperature for the second electric drive E2 and, on this basis, to determine a reserve for a remaining torque able to be generated on the respective drive.

If the drives sense multiple temperatures, then the temperature which represents the critical temperature used for torque limitation can be used.

A comparison of the thermal reserves dT1 and dT2 provides information about which drive currently has the lesser temperature reserve. The signal of the current thermal trim can then be further utilized for a control to set a desired trim. The trim can in this case represent a different torque distribution on the drives.

Subsequently, a control deviation e can be ascertained, which can be ascertained for the respective drive (E1, E2) based on a difference between a predetermined temperature difference dTdes of both drives in relation to each other and the respective difference value of the drive (dT1, dT2), in which case the predetermined temperature difference dTdes can represent a weighting of a reserve utilization, whereby the control deviation e can be converted into a torque distribution between the drives (E1, E2) and/or set using a regulation device.

The control deviation e can be formed from the difference of such a predetermined specification trim (dTdes) and the current trim (difference between dT1 and dT2). The target trim can provide a weighting of the thermal reserve utilization between the first and second drives, e.g., between the front and rear drives. At a negative value of dTdes, it can be provided that the thermal reserve of the first, for example front drive, is to be weighted more strongly (e.g., greater power/duration on the front drive to recuperate). A positive value of dTdes can embody a higher weighting of the second, for example, rear drive (e.g., greater power/duration on the rear drive to accelerate).

The control deviation can be generated using a regulator, e.g. a P regulator at an amplification K, and converted into a resulting trim (difference, deviation from the uniform distribution) of the torque distribution facFTemp. The amplification (K) can be predetermined in the form of a characteristic curve with a constant value or the input-output behavior of the controller, e.g., as shown in to FIG. 3. By predetermining the characteristic curve, a non-linear behavior can be enabled in order to, e.g., specify a range within which no or little change in the torque distribution is intended to occur at low control deviations.

The output signal facFTemp then represents the change in torque distribution in order to influence the temperature ratios. These ratios can be superimposed on a distribution oriented to factors other than temperature, e.g., according to energy efficiency or driving dynamics, thus forming a final distribution value facFtot. The distribution value can be interpreted such that both drives can provide the same torque at a value of 0.5. If its value is equal to 1, then the total torque is provided only by the front drive. If the value is equal to 0, then the total torque is provided only by the rear drive. Furthermore, the limitation of the distribution value facFTot and the total torque tqReqTotLim (both drives together) can be based on the current torque limits, as well as a conversion into the target torques of the drives tqDesFront for the front and tqDesRear for the rear. By way of example, standard procedures can be used in this case.

The blocks x describe a multiplication process. Together with the block "1", this is used to convert the sum torque into torque for the drives. tqDesFront=facFtot*tqReqTotLim or tqDesRear=(1-facFtot)*tqReqTotLim.

In this case, tqReqTot (total requested torque) denotes the torque requested by the driver, while tqReqTotLim (total limited requested torque) denotes the driver-desired torque limited to the limits of the axles.

Figure 3:
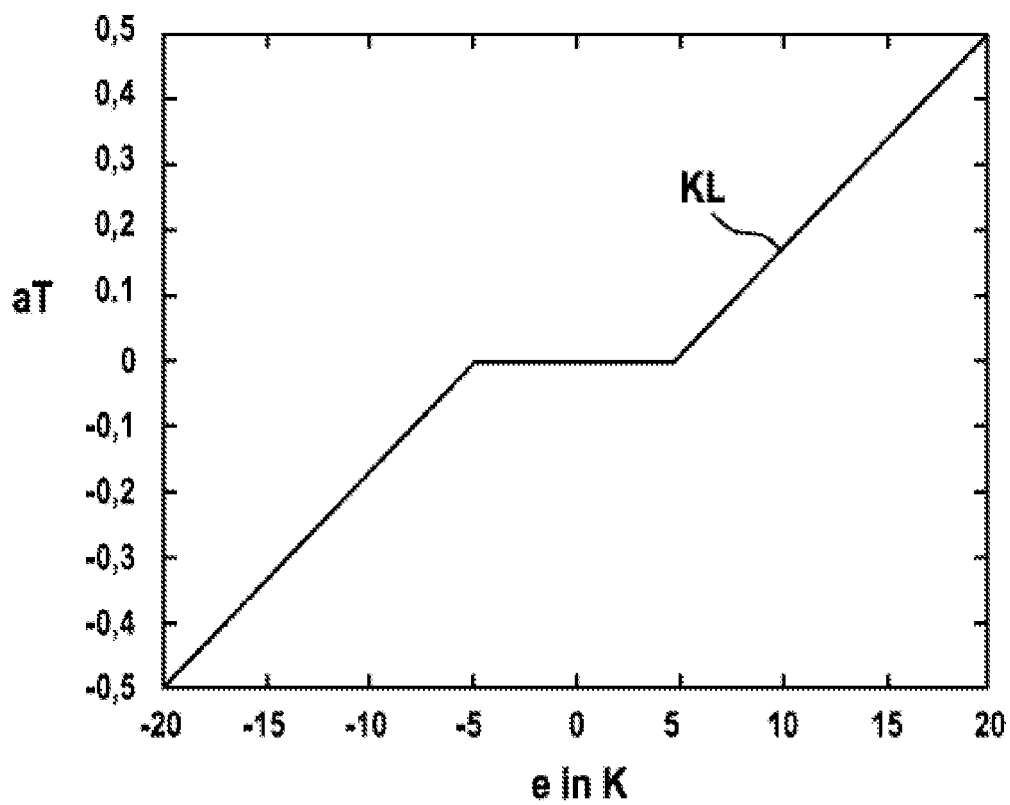
FIG. 3 a characteristic curve of a regulation device for an electric drive apparatus according to one exemplary embodiment of the present invention.

FIG. 3 shows a characteristic curve of a regulation device for an electric drive apparatus according to one exemplary embodiment of the present invention.

As described in the method according to the invention and in connection with FIG. 2, a control deviation e (in Kelvin) can be ascertained, whereby the control deviation e can be converted into a torque distribution between the drives and/or set using a regulation device. The regulation device can in this case define a characteristic curve KL for the torque distribution on the drives.

The Y-axis describes the change in torque distribution. The torque distribution is a value between 0 and 1 and describes the ratio between the front axle torque and the total torque. The Y-value of 0.1 in the diagram means that the front axle is assuming 10% more torque (relative to the total torque). Accordingly, a value of −0.2 would mean that the rear axle is assuming 20% more torque.

For example, the regulation device can be a P regulator with amplification, and it can be converted into a trim of the torque distribution. The input-output behavior of the controller can be predetermined in the form of a characteristic curve KL. By predetermining the characteristic curve, a non-linear behavior can be enabled in order to, e.g., specify a range within which no or little change in the torque distribution is intended to occur at low control deviations.

Figure 4:
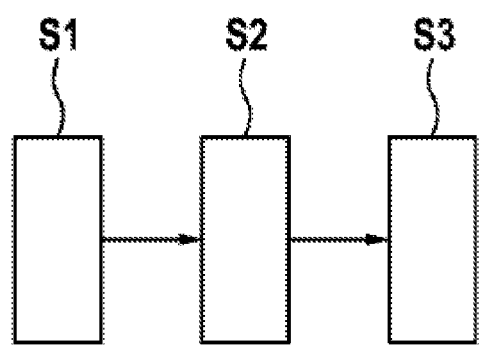
FIG. 4 a block diagram of method steps of the method for operating an electric drive apparatus for a vehicle according to an exemplary embodiment of the present invention.

FIG. 4 shows a block diagram of method steps of the method for operating an electric drive apparatus for a vehicle in accordance with an exemplary embodiment of the present invention.

In the method for operating an electric drive apparatus for a vehicle, an electric drive apparatus according to the invention is provided S1; a first operating temperature of the first electric drive and a second operating temperature of the second electric drive are ascertained S2; and a generation of a first torque at the first electric drive and/or of a second torque at the second electric drive are controlled S3 on the basis of a driving situation of the vehicle and/or on the basis of the first operating temperature and/or the second operating temperature by means of the control device, whereby the respective first or second torque whose associated operating temperature exceeds a predetermined value is reduced, and the corresponding other respective first or second torque whose associated operating temperature is lower than the predetermined value is increased.

Although the present invention has been completely described hereinabove with reference to the preferential embodiment, it is not limited thereto and can be modified in a variety of ways.

The invention claimed is:

1. An electric drive apparatus (10) for a vehicle (F), the electric drive apparatus comprising:
   a first electric drive (E1), which is mountable on a front axle of the vehicle;
   a second electric drive (E2), which is mountable on a rear axle of the vehicle (F);
   a control device (SE), which is connected to the first electric drive (E1) and to the second electric drive (E2)

and is configured to ascertain a first operating temperature (T1) of the first electric drive (E1) and a second operating temperature (T2) of the second electric drive (E2) and to control generation of a first torque (M1) on the first electric drive (E1) and/or of a second torque (M2) on the second electric drive (E2) on the basis of a driving situation of the vehicle and/or on the basis of the first operating temperature (T1) and/or the second operating temperature (T2), wherein the respective first torque (M1) or the second torque (M2) whose associated operating temperature exceeds a predetermined value is reducible, and the corresponding other respective first torque (M1) or second torque (M2) whose associated operating temperature is lower than the predetermined value is increasable.

2. The electric drive apparatus (10) according to claim 1, wherein the predetermined value comprises a first limit value for the first operating temperature (T1) and a second limit value for a second operating temperature (T2).

3. The electric drive apparatus (10) according to claim 1, comprising a first temperature sensor device (TS1) for the first electric drive (E1), using which sensor device the first operating temperature (T1) can be sensed and communicated to the control device (SE), and comprising a second temperature sensor device (TS2) for the second electric drive (E2), using which sensor device the second operating temperature (T2) can be sensed and communicated to the control device (SE).

4. The electric drive apparatus (10) according to claim 1, comprising a regulation device (RE), using which a torque distribution between the first electric drive (E1) and the second electric drive (E2) can be regulated.

5. The electric drive apparatus (10) according to claim 1, wherein the control device (SE) is designed to form a first differential value (dT1) between a maximum limit temperature and a current temperature for the first electric drive (E1) and/or a second differential value (dT2) between a maximum limit temperature and a current temperature for the second electric drive (E2) and, on this basis, ascertain a reserve for a remaining torque still able to be generated on the respective drive (E1, E2).

6. The electric drive apparatus (10) according to claim 1, wherein the control device (SE) is designed to influence the first operating temperature (T1) and/or the second operating temperature (T2) by means of a torque distribution able to be generated in order to maintain said temperature(s) below a respective limit value.

7. The method according to claim 6, wherein the first operating temperature (T1) and/or the second operating temperature (T2) are influenced by a generated torque distribution in order to maintain said temperature(s) below a respective limit value.

8. A method for operating an electric drive apparatus (10) for a vehicle (F), where the electric drive apparatus (10) includes a first electric drive (E1), which is mountable on a front axle of the vehicle; a second electric drive (E2), which is mountable on a rear axle of the vehicle (F); and a control device (SE), which is connected to the first electric drive (E1) and to the second electric drive (E2), the method comprising the following steps:

ascertaining (S2) a first operating temperature (T1) of the first electric drive (E1) and a second operating temperature (T2) of the second electric drive (E2); and controlling (S3) a generation of a first torque (M1) on the first electric drive (E1) and/or a second torque (M2) on the second electric drive (E2) on the basis of a driving situation of the vehicle and/or on the basis of the first operating temperature (T1) and/or the second operating temperature (T2) by means of the control device (SE), wherein the respective first torque (M1) or the second torque (M2) whose associated operating temperature exceeds a predetermined value is reduced, and the corresponding other respective first torque (M1) or second torque (M2) whose associated operating temperature is less than the predetermined value is increased.

9. The method according to claim 8, wherein a current temperature and a maximum limit temperature and/or a maximum achievable torque and a minimum achievable torque are ascertained for the first electric drive (E1) and/or the second electric drive (E2).

10. The method according to claim 9, wherein a first differential value (dT1) between a maximum limit temperature and a current temperature for the first electric drive (E1) and/or a second differential value (dT2) between a maximum limit temperature and a current temperature for the second electric drive (E2) is formed and, on this basis, a reserve for a remaining torque still able to be generated on the respective drive (E1, E2) is ascertained.

11. The method according to claim 10, wherein a regulation deviation (e) is ascertained, which is ascertained for the respective drive (E1, E2) based on a difference between a predetermined temperature differential (dTdes) of both drives relative to each another and the respective differential value of the drive (dT1, dT2), wherein the predetermined temperature differential (dTdes) represents a weighting of the utilization of the reserve, wherein the control deviation (e) is converted into a torque distribution between the drives (E1, E2) and/or set using a regulation device (RE).

12. The method according to claim 11, wherein the regulation device (RE) provides a characteristic curve (KL) for the distribution of the torques on the drives (E1, E2).

* * * * *